United States Patent [19]

Bauer et al.

[11] 4,251,150
[45] Feb. 17, 1981

[54] ARRANGEMENT FOR CLOSING AND OPENING A FILM SHEET CASSETTE, AND FILM SHEET CASSETTE PROVIDED WITH SUCH ARRANGEMENT

[75] Inventors: Walter Bauer, Munich; Heinz Kröbel, Taufkirchen; Heinrich Färber, Munich, all of Fed. Rep. of Germany

[73] Assignee: AGFA-Gevaert, A.G., Leverkusen, Fed. Rep. of Germany

[21] Appl. No.: 106,896

[22] Filed: Dec. 26, 1979

[30] Foreign Application Priority Data

Dec. 29, 1978 [DE] Fed. Rep. of Germany ....... 2856704

[51] Int. Cl.$^3$ .......................... G03B 17/26; G03C 5/16
[52] U.S. Cl. ..................................... 354/281; 250/481
[58] Field of Search ............................. 354/276, 281; 250/475.1, 480, 481

[56] References Cited

U.S. PATENT DOCUMENTS

| | | | |
|---|---|---|---|
| 2,878,389 | 3/1959 | Raffman | 250/481 |
| 3,824,613 | 7/1974 | Matsui | 354/281 |
| 3,964,107 | 6/1976 | Stievenart et al. | 250/475.1 X |

Primary Examiner—Donald A. Griffin
Attorney, Agent, or Firm—Michael J. Striker

[57] ABSTRACT

An arrangement for closing and opening a film sheet cassette, particularly an X-ray film cassette, has a bottom element, and a top element provided with a projection and movable relative to the bottom element between closed and open positions. A sliding element is provided having a projection engageable with the projection of the top element in the closed position, and disengageable from the same in the open position. A spring member urges the sliding element into and retains the same in engagement with the projection of the top element in the closed position. An elastic detent element retains the sliding element when the latter is disengaged from the projection of the top element in the open position. The elastic detent element is actuated by the top element when the latter moves from the open position into the closed position, so that the sliding element ceases to be retained by the elastic detent element and is urged by the spring into the engagement of the projection of the top element.

9 Claims, 3 Drawing Figures

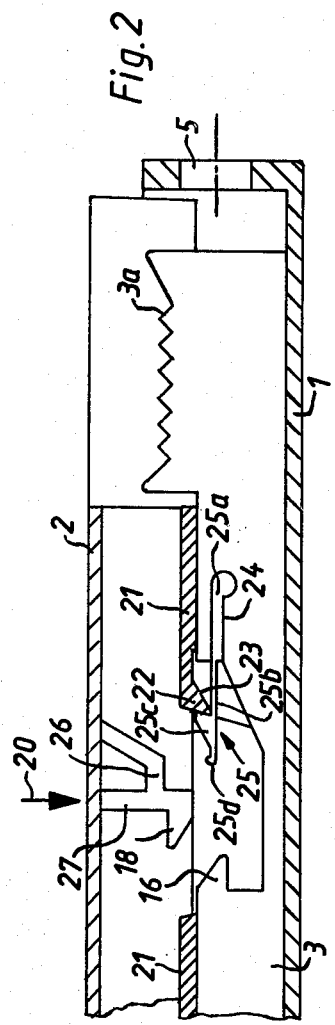
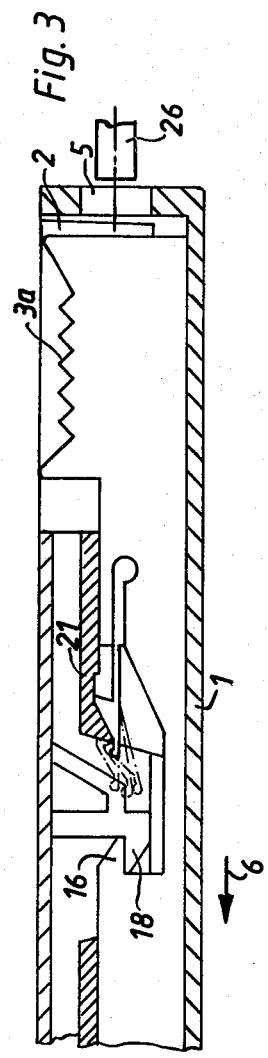
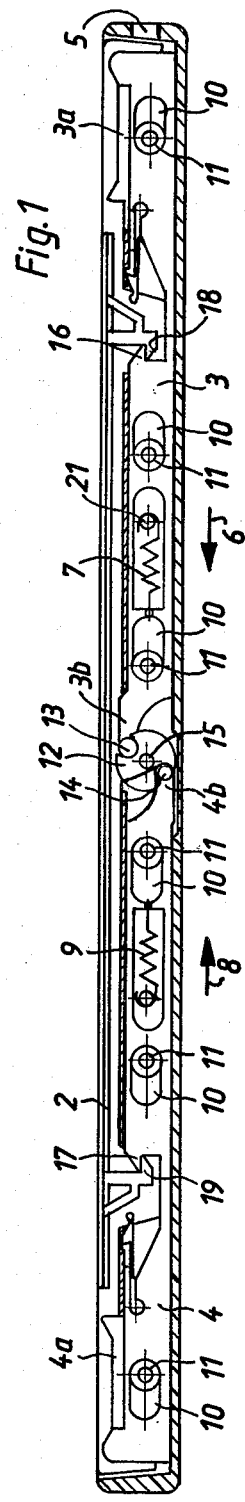

ARRANGEMENT FOR CLOSING AND OPENING A FILM SHEET CASSETTE, AND FILM SHEET CASSETTE PROVIDED WITH SUCH ARRANGEMENT

BACKGROUND OF THE INVENTION

The present invention relates to an arrangement for closing and opening a film sheet cassette, and a film sheet cassette provided with such an arrangement. More particularly, the invention is concerned with an X-ray cassette and an arrangement for opening and closing of the same.

Known film sheet cassettes have a bottom part and a top part movable between open and closed positions, wherein an arrangement for opening and closing the same has a sliding element which is retained in the closed position by a spring and has a hook engageable in a projection of the top element in the closed position. In the known cassettes, the top element or cassette cover is connected with an edge of the bottom element by a hinge, and the closing or locking elements are located either at the side which is opposite to the hinge, or at both sides extending from the side where the hinge is provided. Cassettes are also known in which the cover element is placed onto the bottom element in a substantially parallel direction and fixed by the closing elements at at least two opposite sides.

In the cassettes of the abovementioned type, the closing of the cassette is performed by the user by pressing the cover element onto the bottom element and displacing of the sliding element in a direction transverse to the closing direction of the cover element. In this construction, an element which is generally arranged on the cover element presses onto an inclined surface of the sliding element which is guided on the bottom element, so that the sliding element is displaced from its closed position. Thereby, in order to provide for this action the user must often apply relatively high force. It has also been shown that when several closing or locking elements are provided, one of the locking elements is often not completely actuated so that the cassette after some manipulations remains open at one corner.

SUMMARY OF THE INVENTION

Accordingly, it is an object of the present invention to provide an arrangement for opening and closing of a film sheet cassette, and a film sheet cassette with such an arrangement, which avoid the disadvantages of the prior art.

More particularly, it is an object of the present invention to provide an arrangement for closing and opening of a film sheet cassette and a cassette with such an arrangement in which closing of the cassette can be performed easier and more safely than in the known arrangements and cassettes.

In keeping with these objects and with others which will become apparent hereinafter, one feature of the present invention resides, briefly stated, in an arrangement having a bottom element and a top element with a projection, a sliding element having a further projection engageable with the projection of the top element in the closed position and disengageable from the same in the open position, and a spring member urging the sliding element into and retaining the same in engagement with the projection of the top element in the closed position, wherein an elastic detent element is provided which retains the sliding element when the latter is disengaged from the projection of the top element in the open position, and which is actuated by the top element when the latter moves from the open position into the closed position, so that the sliding element ceases to be retained by the elastic detent element and is urged by the spring into the engagement with the projection of the top element.

Another feature of the present invention is a film sheet cassette which is provided with the above-described closing and opening arrangement.

When the closing and opening arrangement and the cassette are constructed in accordance with the applicants' invention, closing of the cassette cover or top element can be performed by the user substantially only by overcoming of the prestress of the top element. Moreover, by a respective arrangement of the elastic detent element, it is guaranteed that the sliding element is first urged into its closing position when it can actually engage with the hook of the cassette.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a view showing a section of a cassette in a closed position, in accordance with the present invention;

FIG. 2 is a view showing an enlarged part of FIG. 1 and illustrating a closing and opening arrangement of the inventive cassette in open condition; and FIG. 3 is a view corresponding to the view shown in FIG. 2 but illustrating the inventive cassette in closed condition.

DESCRIPTION OF A PREFERRED EMBODIMENT

The drawings show an X-ray film cassette having a bottom part identified by reference numeral 1 and a top or cover part identified by reference numeral 2. The top part 2 is articulately connected with the bottom part 1 by a not shown hinge.

Sliding elements 3 and 4 are provided at the side of the bottom part 1 which is opposite to the hinge. The sliding elements 3 and 4 are guided in suitable guiding means on a side wall of the bottom part 1. Actuating elements such as gripping portions 3a and 4a are formed on the sliding elements 3 and 4, respectively. When the top part 2 is closed, the actuating elements are accessible through recesses in the top part 2. The sliding elements 3 and 4 can be actuated by hand, or by a pin of an opening mechanism. The pin can extend through a hole 5 provided in the side wall of the bottom part 1 and acts upon the side face of the gripping members 3a or 4a.

The sliding element 3 is displaceable in direction of the arrow 6 and retained in immovable position shown in FIG. 1 by a tension spring 7 which hangs on the bottom part 1. Similarly, the sliding element 4 is displaceable in direction of the arrow 8 and retained in the immovable position shown in FIG. 1 by a tension spring 9 which also hangs on the cassette. The sliding elements 3 and 4 have longitudinal slots 10 extending parallel to the directions of displacement 6 and 8. Pins 11 provided on the side walls of the bottom part 1 are guided in the longitudinal slots 10.

Projections 3b and 4b are formed on the opposite ends of the sliding elements 3 and 4. The projection 3b is articulately connected with one end of a lever element 12 in a pivot point 13, and the projection 4b is articulately connected with the other end of the lever element 12 in a pivot point 14. The lever element 12 is rotatably mounted in its center for rotation about an axle 15 arranged in the side wall of the bottom part 1. It is advantageous when the lever element 12 is formed as a small reel in which radial slots are provided in the pivot points 13 and 14. Pins arranged in the projections 3b and 4b extend, in this case, through the abovementioned radial slots.

Hooks 16 and 17 are formed on the sliding elements 3 and 4, respectively. In the unoperated or rest position of the sliding elements 3 and 4, the hooks 16 and 17 engage hooks 18 or 19 provided on the top part 2, in order to close the cassette.

The essence of the present invention is further illustrated in FIGS. 2 and 3. An L-shaped guide member 21 is connected with the bottom part 1. The guide member 21 guides the sliding element 3 at its both sides, and the sliding element is held against a not shown side wall of the bottom part. The guide member 21 has a recess in the region of the hooks 16 and 18. The guide member 21 is formed, on one edge of the recess, with a projection 22 having an inclined surface 23.

A slot 24 is provided in the sliding element 3, and an elastic detent member 25 is inserted in the slot 24. The elastic detent member 25 has a holding portion 25a located in the slots 24, a springy or elastically yieldable central portion 25b, and a hook-shaped projection portion 25c. A nose portion 25d is further formed on the hook-shaped projecting portion 25c. A projection 26 is arranged on the top part of the cassette, substantially in the region of the nose portion 25d of the detent member 25.

The above-described closing and opening arrangement operates, and the above-described cassette closes and opens in the following manner:

FIG. 2 shows the cassette in open condition, that is when the top part 2 is located immediately above the closing position and can be urged in direction of the arrow 20. The sliding element 3 is located in a waiting position in which it is held against force of the spring 7 by the detent member 25, which latter engages by its projecting portion 25c with the hook 22 of the guide member 21.

When the top part 2 of the cassette is further pressed in direction 20 onto the bottom part 1, the projection 26 of the top part 2 presses against the nose portion 25d of the detent member 25. The detent member 25 gradually moves, as shown in FIG. 3 toward the bottom part 1. As soon as the hook-shaped projecting portion 25 becomes disengaged from the projection 22 of the guide member 21, the sliding element 3 under the action of force of the spring 7 moves in direction opposite to the arrow 6, so that the hook 16 of the sliding element 3 engages with the hook 18 of the top part 2.

In order to open the cassette, the gripping member 3a can be manually moved in direction 6. The sliding element 3 can also be moved by a pin 26 of the opening mechanism in the above-mentioned direction. Thereby the hook 16 and the pin disengage from one another, on the one hand, and the elastic detent member 25 slides over the inclined surface 23 of the guide member 21 and deflects in direction toward the bottom part. This deflection takes place until the sliding element 3 attains a position in which the elastic detent member is urged by its hook-shaped projecting portion 25c behind the projection 22 of the guide member 21, as a result of elastic properties of the detent member. Thus, the sliding element 3 is retained in the open position against the force of the spring 7 until the top part 2 is again closed.

The sliding element 4 is provided with the same means with which the sliding element 3 is provided. Since both sliding elements 3 and 4 are connected via the lever element 12, only one sliding element can be actuated for opening of the cassette. It is to be understood that the arrangement in accordance with the present invention can also utilize closing or locking means which are separate from one another.

It will be understood that each of the elements described above, or two or more together, may also find a useful application in other types of constructions differing from the types described above.

While the invention has been illustrated and described as embodied in an arrangement for closing and opening of a film sheet cassette and a cassette provided with such an arrangement, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for closing and opening a film sheet cassette, particularly an X-ray film cassette, having a bottom element and a top element provided with a projection and movable relative to the bottom element between closed and open positions, the arrangement comprising a sliding element having a further projection engageable with the projection of the top element in the closed position and disengageable from the same in the open position; a spring member urging said sliding element into and retaining the same in engagement with the projection of the top element in the closed position; and an elastic detent element returning said sliding element when the latter is disengaged from the projection of the top element in the open position, said elastic detent element being actuated by the top element when the latter moves from the open position into the closed position, so that said sliding element ceases to be retained by said elastic detent element and is urged by said spring into the engagement with the projection of the top element.

2. An arrangement as defined in claim 1, wherein said further projection of said sliding element is a hook section.

3. An arrangement as defined in claim 1, wherein said elastic detent element is arranged on said sliding element.

4. An arrangement as defined in claim 1, wherein the bottom element has a portion rigidly connected with the same, said elastic detent element which is arranged on said sliding element being engageable with the rigidly connected portion of the bottom element in the open position.

5. An arrangement as defined in claim 4, wherein the bottom element has a guide member having a recess and formed with the rigidly connected portion, said elastic detent element being engageable with the rigidly connected portion formed on said guide member.

6. An arrangement as defined in claim 1, wherein the top element has a projecting section, said elastic detent element having a nose portion which is arranged relative to the projecting section of the top element so that when the top element moves from the open position to the closed position, the projecting section of the top element acts upon said nose portion and deflects said elastic detent element.

7. An arrangement as defined in claim 1, wherein said elastic detent element has a hook portion cooperating with the bottom element so as to deflect said elastic detent element when said sliding element moves from engaged to disengaged positions.

8. An arrangement as defined in claim 7, wherein the bottom element has a rigidly connected and inclined portion, said hook portion having an inclined surface cooperating with said rigidly connected inclined portion of the bottom element so as to deflect said elastic detent element during the movement of said sliding element between the engaged and disengaged positions.

9. A film sheet cassette, particularly an X-ray film cassette, comprising a bottom element; a top element provided with a projection and movable relative to said bottom element between closed and open positions; and means moving said top element between said positions, said means including a sliding element having a further projection engageable with said projection of said top member in said closed position and disengageable from the same in the open position; a spring member urging said sliding element into and retaining the same in engagement with said projection of said top element in said closed position, and and an elastic detent element retaining said sliding element when the latter is disengaged from said projection of said top element in said open position said elastic detent element being actuated by said top element when the latter moves from said open position into said closed position, so that said sliding element ceases to be retained by said elastic detent element and is urged by said spring into the engagement with said projection of said top element.

* * * * *